United States Patent
Beckman

(10) Patent No.: US 7,431,805 B2
(45) Date of Patent: Oct. 7, 2008

(54) METHOD AND APPARATUS FOR SIMULTANEOUS HEAT AND MASS TRANSFER UTILIZING A CARRIER-GAS AT VARIOUS ABSOLUTE PRESSURES

(75) Inventor: James R. Beckman, Tempe, AZ (US)

(73) Assignee: Arizona Board of Regents, Tempe, AZ (US)

( * ) Notice: Subject to any disclaimer, the term of this patent is extended or adjusted under 35 U.S.C. 154(b) by 154 days.

(21) Appl. No.: 11/004,400

(22) Filed: Dec. 3, 2004

(65) Prior Publication Data
US 2005/0121304 A1 Jun. 9, 2005

Related U.S. Application Data

(60) Provisional application No. 60/526,933, filed on Dec. 3, 2003.

(51) Int. Cl.
*B01D 3/34* (2006.01)
*B01D 3/42* (2006.01)
*B01F 3/04* (2006.01)
*B01D 1/22* (2006.01)

(52) U.S. Cl. .............................. 203/2; 62/121; 202/155; 202/158; 202/160; 202/173; 202/267.1; 203/49; 203/27; 203/86; 203/80; 203/DIG. 8; 261/75; 261/128

(58) Field of Classification Search .................... 203/2, 203/49, 24–27, 86, 73, 80, DIG. 4, DIG. 8; 202/153–156, 160, 158, 172–173, 267.1; 159/17.4, DIG. 15; 62/121; 261/75, 128, 261/153
See application file for complete search history.

(56) References Cited

U.S. PATENT DOCUMENTS 2,327,643 A * 8/1943 Houghland .................. 62/630

(Continued)

FOREIGN PATENT DOCUMENTS

DE 20 18 726 11/1971

(Continued)

OTHER PUBLICATIONS

Authors: Roy Larson, Walter Albers, James Beckman, Scott Freeman; Title: The Carrier-Gas Process—A New Desalination and Concentration Technology; Date: 1989: Pertinent Pages: vol. 73, pp. 119-137.

(Continued)

*Primary Examiner*—Virginia Manoharan
(74) *Attorney, Agent, or Firm*—McDonnell Boehnen Hulbert & Berghoff LLP

(57) ABSTRACT

A method, system, and apparatuses for simultaneous heat and mass transfer utilizing a carrier-gas at various absolute pressures are described. A method may include: thermally coupling at least two continuous contacting apparatuses together; varying the pressure between the at least two continuous contacting apparatuses; allowing heat removed from the first continuous contacting apparatus to be the heat delivered to the second continuous contacting apparatus. A system may include: at least two continuous contacting apparatuses thermally coupled together and operating at different absolute pressures. A continuous contacting apparatus may include: an evaporation chamber and a dew-formation chamber both operating at an absolute pressure in a vacuum range. A continuous contacting vapor recompression apparatus may include: an evaporation chamber operating at a first absolute pressure; and a dew-formation chamber operating at a second absolute pressure higher than the first absolute pressure.

18 Claims, 12 Drawing Sheets

U.S. PATENT DOCUMENTS

| | | | | |
|---|---|---|---|---|
| 2,666,019 | A | * | 1/1954 | Steffens et al. ............. 208/351 |
| 3,788,954 | A | | 1/1974 | Cantrell |
| 4,055,473 | A | | 10/1977 | Hay |
| 4,277,268 | A | * | 7/1981 | Spangler, Jr. ................. 62/630 |
| 4,349,415 | A | | 9/1982 | DeFillippi et al. |
| 4,350,570 | A | | 9/1982 | Maisotsenko et al. |
| 4,595,459 | A | | 6/1986 | Kusakawa et al. |
| 4,832,115 | A | | 5/1989 | Albers et al. |
| 4,967,829 | A | | 11/1990 | Albers et al. |
| 4,982,782 | A | | 1/1991 | Albers et al. |
| 5,020,335 | A | | 6/1991 | Albers et al. |
| 5,020,588 | A | | 6/1991 | Albers et al. |
| 5,097,668 | A | | 3/1992 | Albers et al. |
| 5,123,481 | A | | 6/1992 | Albers et al. |
| 5,290,403 | A | | 3/1994 | Saask |
| 5,435,436 | A | * | 7/1995 | Manley et al. ................ 203/74 |
| 5,791,161 | A | * | 8/1998 | Manley ....................... 62/630 |

FOREIGN PATENT DOCUMENTS

| | | |
|---|---|---|
| FR | 2 333 544 | 7/1977 |
| WO | WO 88/06054 | 8/1988 |
| WO | WO 01/07134 | 2/2001 |
| WO | WO 2004/024282 | 3/2004 |

OTHER PUBLICATIONS

Furter, William F. Salt Effect in Distillation: A Literature Review II, The Canadian Journal of Chemical Engineering, vol. 55, Jun. 1977, pp. 229-238.

Furter, William F. Salt Effect in Distillation: A Literature Review II, The Canadian Journal of Chemical Engineering, vol. 55, Jun. 1977, pp. 23-36.

Guerreri, G. Membrane Alcohol Separation Process—Integrated Pervaporation and Fractional Distillation, Trans IChemE, vol. 70, Part A, Sep. 1992, pp. 501-508.

Agrawal, Rakesh; Fidkowski, Zbigniew T.; Xu, Jianguo Prefractionation to Reduce Energy Consumption in Distillation without Changing Utility Temperatures, AIChE Journal, vol. 42, No. 8, Aug. 1996, pp. 2118-2127.

Beckman, James R.; Albers, Walter F. Energy-Efficient Ethanol-Water Fractionation by a Carrier-Gas Method, AIChE Journal, vol. 37, No. 2, Feb. 1991, pp. 281-284.

Davis, J. F.; Tung. Hsien-Hsin; Mah, R. S. H. Fractionation with Condensation and Evaporation in Wetted-Wall Columns, AIChE Journal, vol. 30, No. 2, Mar. 1984, pp. 328-338.

Daugulis, Andrew J.; Axford, Darryl B.; McLellan, P. James The Economics of Ethanol Production by Extractive Fermentation; The Canadian Journal of Chemical Engineering, vol. 69, Apr. 1991, pp. 488-497.

Beckman, James R.; Hamieh, Bassem M. Carrier-Gas Desalination Analysis Using Humidification-Dehumidification Cycle, Dept. of Chemical, Bio and Materials Engineering, Arizona State University, 1999, pp. 183-193.

Hamieh, Bassem M.; Beckman, James R.; Ybarra, Michael D. Brackish and Seawater Desalination Using a 20 ft2 Dewvaporation Tower, Dept. of Chemical, Bio and Materials Engineering, Arizona State University, 2001, pp. 217-226.

Hamieh, Bassem M.; Beckman, James R.; Ybarra, Michael D. The Dewvaporation Tower: An Experimental & Theoretical Study with Economic Analysis, Desalination & Water Reuse, vol. 10/2, 2000, pp. 35-43.

Beckman, James R. U.S. provisional patent application titled "Method and Apparatus for Desalination and Concentration by a Carrier-Gas Tower" 1999, all pages.

Beckman, James R. Carrier-Gas Enhanced Atmospheric Pressure Desalination Final Report, Sep. 2002, all pages.

Beckman, James R. Pressurized Industrial Dewvaporation Design CGS Evaporation Pond Water Reclamation Final Report, Jun. 2004, all pages.

Beckman, James R. Innovative Atmospheric Pressure Desalination Final Report, Sep. 1999, all pages.

Beckman, James R.; Ybarra, Michael; Flores, Melvin Staged Carrier-Gas Fractionation Analysis, Unpublished, 1999, all pages.

Davis, Andrew R. Laboratory to Industry: Industrialization of the Dewvaporation Process, MS Thesis, Arizona State University, Dec. 2003, all pages.

* cited by examiner

METHOD AND APPARATUS FOR SIMULTANEOUS HEAT AND MASS TRANSFER UTILIZING A CARRIER-GAS AT VARIOUS ABSOLUTE PRESSURES

CROSS REFERENCE TO RELATED APPLICATION

This application claims priority to U.S. Provisional Patent Application to James R. Beckman entitled "METHOD AND APPARATUS FOR SIMULTANEOUS HEAT AND MASS TRANSFER UTILIZING A CARRIER-GAS AT VARIOUS ABSOLUTE PRESSURES," Ser. No. 60/526,933, filed Dec. 3, 2003, now pending, the disclosure of which is hereby incorporated entirely herein by reference.

FEDERALLY SPONSORED RESEARCH

This project was partially funded by financial assistance provided by the United States Government through the Salt River Project, Project No. 031590; and the United States Government may own certain rights to this invention.

BACKGROUND

1. Technical Field

This document relates to a method, system, and apparatuses for simultaneous heat and mass transfer utilizing a carrier-gas at various absolute pressures.

2. Background Art

In view of the increasing need to obtain clean water or to minimize the volume of waste waters, or both, many conventional separation techniques have been studied and developed. One example of such a conventional separation technique is desalination. Many technologies have been used to perform desalination, but economic factors have dictated the preferred technologies. For example, reverse osmosis (RO) is good for desalination of mild brackish water (e.g., less than 1000 ppm total dissolved solids (TDS)). This preference results from the fact that other technologies utilize techniques which require costly phase changes of the liquid, such as boiling a liquid into a gas. In contrast, RO employs low-pressure pumps (less than 100 psi) to force water through semi-permeable membranes, thereby consuming less energy than a boiling process.

However, RO is ineffective in purifying water containing non-filterable suspended particulates. For example, the process of chemical mechanical polishing (CMP) used by the silicon industry discharges an aqueous slurry containing about 15% by weight of aluminum oxide particles. Being less than about 1 micron in size, these particles are non-filterable and readily foul RO membranes. As a result, the CMP slurries are typically discharged to the environment, which has been historically less costly then investing in low capacity thermal technologies. Still another example is the purification of river water. Many rivers, such as the Colorado River, contain silt in the 1 micron range which can foul RO membranes, thereby increasing the maintenance and/or pretreatment costs of RO operations.

For the more TDS intense aqueous applications, such as waste water streams and sea water, other mechanical and thermal technologies economically compete with RO. In sea water desalination, for example, the RO pump pressures increase to 1000 psi. Furthermore, feed waters require expensive pretreatments in order to protect and extend the life of the membranes. Technologies in competition with RO for seawater desalination include mechanical vapor compression (MVC), multi-stage flash distillation (MSF), and multi-effect distillation (ME) with and without thermal vapor compression. MVC technology requires shaft power to drive its compressor. The motor can be either electrically or thermally driven. Unfortunately, electrically driven MVC plants consume more electricity than RO units for sea water desalination. The thermally driven processes (MSF and ME) use heat to provide a temperature-driving force at different stages of boiling and condensing and at various stages of pressures. Thus, the thermally driven plants attempt to reuse the high temperature from the applied heat as many times as is economically possible in order to minimize operating costs. This energy reuse factor economically varies from 6 to 12. The energy reuse factor is also referred to as the gain output ration (GOR). As the GOR increases so does the equipment capital cost. The optimum GOR value depends upon typical cost variables, such as plant capacity, cost of energy, cost of materials, etc.

One attempt to overcome these problems involved the use of simultaneous heat and mass transfer in stages utilizing a carrier-gas. In such a staged apparatus, the liquid is sprayed onto each side of a heat transfer wall to obtain enhanced heat and mass transfer coefficients and reduce the required surface area of the heat transfer wall. This technique allowed the film gas heat transfer coefficients to be in the range of about 100 to 300 W/m2 CC, which resulted in condensate production fluxes in the range of about 2.3 to about 6.8 kg of condensate per hour/in2 of heat transfer wall. Since spraying the liquid is essential to maintaining the enhanced heat transfer coefficients, pumps were needed to force the liquid through spray nozzles. However, a staged configuration was required to limit the mixing by the pumps of the liquid compositions and temperatures at different locations of the apparatus. As a result, each stage required a dedicated pump and nozzle, and about 50 to 100 stages were required to achieve GOR values of about 10 to 20. Since each side of the heat transfer wall had to be wetted, this meant that the total number of pumps and nozzles required was from about 100 to about 200. Accordingly, the increased complexity of these apparatus was detrimental to economic and reliable operation.

SUMMARY

In an aspect, this document features a method for separating a liquid component from a liquid mixture in a continuous contacting manner. The method may include: thermally coupling at least two continuous contacting apparatuses together; varying the pressure between the at least two continuous contacting apparatuses; allowing heat removed from the first continuous contacting apparatus to be the heat delivered to the second continuous contacting apparatus.

Implementations may include one or more of the following. The method may be for separating a liquid component from a liquid mixture below the boiling point of the liquid mixture in a continuous contacting manner. Thermally coupling may include thermally coupling at least two continuous contacting apparatuses together in series. Thermally coupling may include thermally coupling at least two continuous contacting apparatuses together through a fluid loop in thermal communication with a condensing heat exchanger of the first continuous contacting apparatus and an evaporating heat exchanger of the second continuous contacting apparatus. Varying the pressure may include operating the first continuous contacting apparatus at a first absolute pressure and operating the second continuous contacting apparatus at a second absolute pressure that is different than the first absolute pressure. Varying the pressure may include operating the first continuous contacting apparatus at a first absolute pressure and operating the second continuous contacting apparatus at a second absolute pressure that is lower than the first absolute pressure. Varying the pressure may include operating the first and second continuous contacting apparatuses at absolute pressures in a range of about high pressure to about high vacuum. Varying the pressure may include operating the first and second continuous contacting apparatuses at absolute pressures in a vacuum range. Varying the pressure may include operating the first and second continuous contacting apparatuses at absolute pressures in a range of about high pressure to about atmospheric pressure. Varying the pressure may include operating the first and second continuous contacting apparatuses at absolute pressures in a range of about 0 psia to about 2,000 psia. Varying the pressure may include operating the first and second continuous contacting apparatuses at absolute pressures in a range of about 0 psia to about 470 psia.

In another aspect, this document features a system for separating a liquid component from a liquid mixture. The system may include at least two continuous contacting apparatuses thermally coupled together, the first continuous contacting apparatus operating at a first absolute pressure and the second continuous contacting apparatus operating at a second absolute pressure that is different than the first absolute pressure.

Implementations may include one or more of the following. The system may be for separating a liquid component from a liquid mixture below the boiling point of the liquid mixture. The second absolute pressure may be lower than the first absolute pressure. The first and second absolute pressures may each be an absolute pressure in a range of about high pressure to about high vacuum. The first and second absolute pressures may each be an absolute pressure in a vacuum range. The first and second absolute pressures may each be an absolute pressure in a range of about high pressure to about atmospheric pressure. The first and second absolute pressures may each be an absolute pressure in a range of about 0 psia to about 2,000 psia. The first and second absolute pressures may each be an absolute pressure in a range of about 0 psia to about 470 psia. The at least two continuous contacting apparatuses may be thermally coupled together in one of series and parallel. The at least two continuous contacting apparatuses may be thermally coupled together in series. The at least two continuous contacting apparatuses may be thermally coupled together through a fluid loop in thermal communication with a condensing heat exchanger of the first continuous contacting apparatus and a evaporating heat exchanger of the second continuous contacting apparatus. Each continuous contacting apparatus may include: an evaporation chamber having first and second ends, an inlet and an outlet for a carrier-gas, and an inlet and an outlet for a liquid mixture, wherein the inlet for the liquid mixture and the outlet for the carrier-gas are located at the first end of the evaporation chamber, and the outlet for the liquid mixture and the inlet for the carrier-gas are located at the second end of the evaporation chamber; a dew-formation chamber having first and second ends, an inlet and an outlet for a carrier-gas, and an outlet for the separable liquid component, wherein the inlet for the carrier-gas is located at the first end of the dew-formation chamber, and the outlet for the carrier-gas and the outlet for the separable liquid component are located at the second end of the dew-formation chamber; a common heat transfer wall capable of providing thermal communication between the evaporation chamber and the dew-formation chamber; a heat source for heating the carrier-gas from the outlet of the evaporation chamber, wherein the heated carrier gas is directed to flow into the inlet of the dew-formation chamber; a heat sink for cooling the carrier-gas from the outlet of the dew-formation chamber, wherein the cooled carrier gas is directed to flow into the inlet of the evaporation chamber; an evaporating heat exchanger, wherein heat from the heat source is brought into thermal communication with the carrier-gas; and a condensing heat exchanger, wherein the carrier-gas is brought into thermal communication with the heat sink.

In still another aspect, this document features a continuous contacting apparatus for separating a liquid component from a liquid mixture. The apparatus may include: an evaporation chamber operating at an absolute pressure in a vacuum range, the evaporation chamber having first and second ends, an inlet and an outlet for a carrier-gas, and an inlet and an outlet for a liquid mixture, wherein the inlet for the liquid mixture and the outlet for the carrier-gas are located at the first end of the evaporation chamber, and the outlet for the liquid mixture and the inlet for the carrier-gas are located at the second end of the evaporation chamber; a dew-formation chamber operating at an absolute pressure in a vacuum range, the dew-formation chamber having first and second ends, an inlet and an outlet for a carrier-gas, and an outlet for the separable liquid component, wherein the inlet for the carrier-gas is located at the first end of the dew-formation chamber, and the outlet for the carrier-gas and the outlet for the separable liquid component are located at the second end of the dew-formation chamber; and a common heat transfer wall capable of providing thermal communication between the evaporation chamber and the dew-formation chamber.

Implementations may include one or more of the following. The apparatus may include one of: a heat source for heating the carrier-gas from the outlet of the evaporation chamber, wherein the heated carrier gas is directed to flow into the inlet of the dew-formation chamber; a heat sink for cooling the carrier-gas from the outlet of the dew-formation chamber, wherein the cooled carrier gas is directed to flow into the inlet of the evaporation chamber; an evaporating heat exchanger, wherein heat from the heat source is brought into thermal communication with the carrier-gas; a condensing heat exchanger, wherein the carrier-gas is brought into thermal communication with the heat sink; and a combination thereof.

In yet another aspect, this document features a continuous contacting vapor recompression apparatus for separating a liquid component from a liquid mixture. The continuous contacting vapor recompression apparatus may include: an evaporation chamber operating at a first absolute pressure, the evaporation chamber having first and second ends, an inlet and an outlet for a carrier-gas, and an inlet and an outlet for a liquid mixture, wherein the inlet for the liquid mixture and the outlet for the carrier-gas are located at the first end of the evaporation chamber, and the outlet for the liquid mixture and the inlet for the carrier-gas are located at the second end of the evaporation chamber; a dew-formation chamber operating at a second absolute pressure higher than the first absolute pressure, the dew-formation chamber having first and second ends, an inlet and an outlet for a carrier-gas, and an outlet for the separable liquid component, wherein the inlet for the carrier-gas is located at the first end of the dew-formation chamber, and the outlet for the carrier-gas and the outlet for the separable liquid component are located at the second end of the dew-formation chamber; and a common heat transfer wall capable of providing thermal communication between the evaporation chamber and the dew-formation chamber.

Implementations may include one or more of the following. The liquid component may be separated from the liquid mixture below the boiling point of the liquid mixture. The first and second absolute pressures may be at least within 1 psi of each other. The second absolute pressure may be at least 1 psi higher than the first absolute pressure. The first and second absolute pressures may each be an absolute pressure in a range of about high pressure to about high vacuum. The first and second absolute pressures may each be an absolute pressure in a vacuum range. The first and second absolute pressures may each be an absolute pressure in a range of about high pressure to about atmospheric pressure. The apparatus may further comprising one of: a compressor for compressing the carrier-gas from the outlet of the evaporation chamber, wherein the compressed carrier gas is directed to flow into the inlet of the dew-formation chamber; a pressure release valve for reducing pressure of the carrier-gas from the outlet of the dew-formation chamber, wherein the carrier gas is directed to flow into the inlet of the evaporation chamber; and a combination thereof.

These and other implementations may have one or more of the following advantages: improved energy efficiency for lower operational costing; operation at low temperatures, thereby allowing use of more waste heat sources; operation under a vacuum; improved evaporation; recycling of carrier-gases; and the like.

These general and specific aspects may be implemented using a system, a method, and/or a computer program, or any combination of systems, methods, and/or computer programs. Additionally, the foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended DRAWINGS, where like designations denote like elements, and.

DESCRIPTION

1. Terminology, Definitions, and Overview

Figure 1:
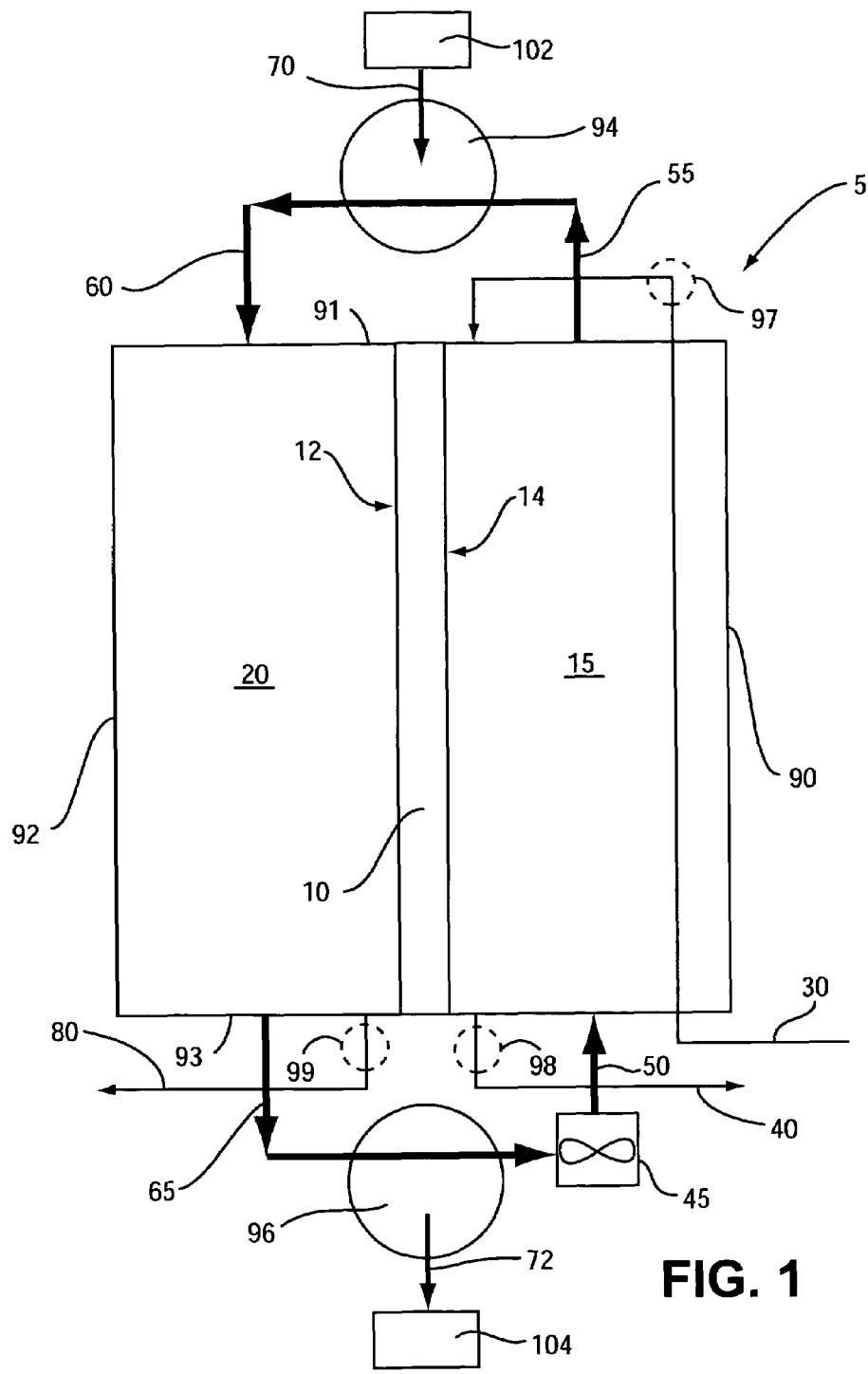
FIG. 1 is a schematic of a continuous contacting apparatus implementation.

In describing implementations, the following terminology will be used in accordance with the definitions and explanations set out below. Notwithstanding, other terminology, definitions, and explanations may be found throughout this document as well.

As used herein, "Dewvaporation" is a term used in its broadest sense and may mean that a liquid component may be separated from a liquid mixture by first causing the liquid mixture to form a vapor (vaporization) below its boiling point and then causing it to condense (dew formation) all in the presence of a carrier gas.

As used herein, "a liquid component" is a term used in its broadest sense and may mean the part of a liquid mixture that can be separated by evaporation.

As used herein, "liquid mixture" is a term used in its broadest sense and may mean (i) liquids containing dissolved solids, (ii) liquids having one or more liquid components with differing vapor pressures from the remaining components in the liquid mixture, or (iii) both.

Apparatus implementations are continuous contacting. As used herein, "continuous contacting" is a term used in its broadest sense and may mean that the liquid mixture is maintained in continuous contact with the heat transfer wall and a carrier-gas, e.g., without the need for re-applying the liquid mixture onto a portion or sector of the heat transfer wall after the liquid mixture is initially placed onto the heat transfer wall, such as in a multi-stage configuration. Furthermore, the movement of the liquid and the gas is not interrupted by mixing of the liquids ahead or behind a particular length of the apparatus, e.g., mixing within a particular stage. Continuous contacting apparatuses implementations, therefore, need a minimal number of pumps, if any (e.g., it is feasible to use only one pump or no pumps (through gravity or a vacuum)), to feed the liquid mixture, and do not require a plurality of pumps and nozzles for a plurality of stages.

As used herein, "carrier-gas" is a term used in its broadest sense and may refer to any gas having a vapor loading capability, a heat transfer capability, thermal conductivity capability, and/or the like capability. Exemplary carrier-gases include, but are not limited to, atmospheric air, nitrogen, flue gas (e.g., from a flame after being scrubbed to remove carbon dioxide), and the like. Air is suitable due to its abundance and low price. An inert gas such as nitrogen is suitable to reduce or eliminate corrosion of metallic walls.

As used herein, "temperature gradient" is a term used in its broadest sense and may mean that, for a given side of the column, the highest temperature is at the top of the column and the lowest temperature is at the bottom of the column with incremental temperature differences in between.

As used herein, "vacuum" is a term used in its broadest sense and may refer to a space that is at least partially exhausted by artificial means. Vacuum may refer to any pressure in the vacuum range (between about 0 psia (high vacuum) and about 14.7 psia (1 atm)).

As used herein, "absolute pressure" is a term used in its broadest sense and is measured relative to high vacuum (0 psia). Absolute pressure may refer to pounds per square inch (absolute) or psia.

As used herein, "thermal communication" or "thermal coupling" are terms used in their broadest sense and may each mean that heat (not mass) can flow between the communicating/coupling components.

As used herein, "about" is a term used in its broadest sense and may mean 10% of the stated value.

Method and apparatus implementations exploit Dewvaporation technology. Individuals skilled in Dewvaporation technology may wish to proceed to the Structure/Function section of this DESCRIPTION. However, those individuals who are new to Dewvaporation technology should read the following overview in order to better understand the features and advantages of method and apparatus implementations.

The International Patent Application under the Patent Cooperation Treaty to James R. Beckman entitled "METHOD AND APPARATUS FOR SIMULTANEOUS HEAT AND MASS TRANSFER UTILIZING A CARRIER-GAS AT VARIOUS ABSOLUTE PRESSURES," International Patent Application No. PCT/US00/20336, filed Jul. 26, 2000, and the International Patent Application under the Patent Cooperation Treaty to James R. Beckman entitled "METHOD AND APPARATUS FOR SIMULTANEOUS HEAT AND MASS TRANSFER UTILIZING A CARRIER-GAS AT VARIOUS ABSOLUTE PRESSURES," International Patent Application No. PCT/US2003/028432, filed Sep. 10, 2003, the disclosures of which are hereby incorporated entirely herein by reference, describe applications of basic principles relating to Dewvaporation technology. This Dewvaporation technology may be used to efficiently separate (e.g., concentrate, purify, fractionate, strip, and/or the like) a liquid component from a liquid mixture using a carrier-gas. Dewvaporation efficiently combines the processes of humidification and dehumidification by using a carrier-gas (e.g., air) to evaporate a liquid component (e.g., water) from a liquid mixture and then forming dew or pure condensate from the saturated carrier-gas at fairly constant pressure (e.g., atmospheric). Thus, Dewvaporation may be an innovative water reclamation process that owes its success to the humidification and subsequent dehumidification of a carrier-gas.

A continuous contacting Dewvaporation apparatus may include at least one evaporation chamber and at least one dew formation chamber, which are separated by at least one common heat transfer wall. For example, a Dewvaporation continuous contacting apparatus may utilize a stack of heat transfer walls. Depending on the specific design, this stack may be comprised of about 30 or more or less heat transfer walls.

Once the liquid mixture is fed onto the evaporation side of the heat transfer wall, the separable liquid component is evaporated into a carrier-gas. The heat needed for evaporation is supplied by the heat released from the dew fall condensation, i.e., formation of dew from the vapor, of the separable component onto the opposite side of a heat transfer wall from the carrier-gas. Virtually any external heat source can be used to provide the necessary heat because: (1) only a small amount of external heat is needed to establish temperature differences across the wall at any given height of the column; and (2) the temperature of the external beat is versatile. For example, the heat source may be from low temperature solar, steam, waste heat, or combustible fuels. The heat source gives a relative range of possible fresh water production rates, as the saturation point of air is heavily dependant upon temperature. Generally, lower temperatures yield lower saturation levels, that translate to lower freshwater production rates for a given air flow rate.

Briefly, the Dewvaporation process works for brackish water reclamation as follows. Air is brought into the bottom of the apparatus on the evaporation side of the heat transfer wall at a wet bulb temperature of 69.80° F. (210° C.), which according to psychometric charts contains 0.025 lb-mole of water vapor per lb-mole of air. The heat transfer wall is wetted by saline feed water, which is fed into the evaporation side at the top of the apparatus. As the air travels to the top of the apparatus, heat is transferred through the heat transfer wall allowing the air to rise in temperature and evaporate water from the falling saline liquid. Concentrated liquid leaves from the bottom of the tower, and hot saturated air leaves the evaporation side of the tower at the top at 200.00° F. (93.50° C.) with a humidity of 2.25 lb-mole of water vapor per lb-mole of air. Heat is added to this air by an external heat source, such as steam, increasing the air humidity and temperature to 2.54 lb-mole of water vapor per lb-mole of air and 202.00° F. (94.40° C.) respectively. By design, the amount of steam required for operation should yield a 20° F. temperature differential between the top of the evaporation and dewformation side. The hotter saturated air is then sent to the dewformation side of the apparatus.

The dewformation side of the apparatus, now being slightly hotter than the evaporation side, allows the air to cool, condense water vapor, and transfer the heat of condensation to the evaporation side as it travels down the apparatus. Finally, pure water condensate and saturated air leave the bottom of the apparatus at 143.80° F. (62.20° C.). The amount of pure water generated from the process is the difference in vapor loading between the top and bottom of the dewformation side, which in this example, is 2.23 lb-mole of water per lb-mole of air transported through the apparatus. Using a typical airflow rate of 2.86 lb-mole per minute (3.0 SCFM), a Dewvaporation apparatus may produce 2 gallons per hour of freshwater with a GOR of 7.7 operating under particular conditions.

2. Structure/Function

There are a variety of continuous contacting apparatus implementations. Notwithstanding, with reference to FIG. 1 and for the exemplary purposes of this disclosure, continuous contacting apparatus 5 is an example of a continuous contacting apparatus implementation. Apparatus 5 may be positioned vertically, as illustrated by FIG. 1, horizontally, or in any position in between, e.g., at a 45-degree angle.

Continuous contacting apparatus 5 may include at least one heat transfer wall 10 having evaporation side 14 and dewformation side 12. At least one heat transfer wall 10 separates at least two vertically extending portions of a column: (i) at least one evaporation portion of the column (evaporation chamber 15), i.e., the portion of the column where the separable component is evaporated from the liquid mixture into a carrier-gas; and (ii) a dew-formation portion of the column (dew-formation chamber 20), i.e., the portion of the column where the separable component in the carrier-gas is condensed.

Continuous contacting apparatus 5 may constantly recycle the carrier-gas flow instead of bringing in ambient air for example at the bottom of evaporation chamber 15 and exhausting air for example from the bottom of dew-formation chamber 20. Furthermore, continuous contacting apparatus 5 may operate at virtually any absolute pressure. That is, continuous contacting apparatus 5 is not limited to operating at 14.7 psia (1 atm) or atmospheric pressure. Rather, continuous contacting apparatus 5 may also operate at virtually any absolute pressure above or below 14.7 psia.

Liquid mixture feed 30 is introduced into the top of evaporation chamber 15 so that the liquid mixture is in physical contact with evaporation side 14 of heat transfer wall 10, and brine 40, i.e., the remaining concentrated liquid mixture, exits at the bottom of evaporation chamber 15. Liquid mixture feed 30 may be introduced at a rate so that the liquid mixture flows down heat transfer wall 10 in a thin layer, thereby enhancing vaporization of the separable component into the carrier-gas as heat is received from dew-formation chamber 20 across heat transfer wall 10. Pump 97 is optional and may be included for above 14.7 psia applications. Pump 98 is optional and may be included for below 14.7 psia applications.

Carrier-gas 50 is introduced at the bottom of evaporation chamber 15 by mover 45. Mover 45 may be any apparatus known in the art that creates positive pressure to move the carrier gas in a particular direction. Nonlimiting examples of useful carrier-gas movers include fans, turbines, pumps, and vacuums. The mover may be placed at one or more of the inlets and outlets of evaporation chamber 15 or dew-formation chamber 20. Saturated carrier-gas 55, i.e., containing the separable liquid component, exits the top of evaporation chamber 15.

Liquid mixture feed 30 may be preheated by undergoing heat exchange with any higher temperature stream. For example, liquid mixture feed 30 may be heat exchanged with exiting condensate stream 65 and/or exiting saturated carrier-gas stream 50. For example, a minor portion (e.g., less than about 15% by volume) of saturated carrier-gas 55 may be used to pre-heat liquid mixture feed 30 by heat exchange or direct contact. Alternatively, heat may otherwise be added to liquid mixture feed 30.

Saturated carrier-gas 55 may then be passed through evaporator/heat exchanger 94, where about half of the distillate in the saturated carrier-gas forms as liquid distillate by adding heat 70 from heat source 102. Any additional amount of heat is sufficient, e.g., even to increase the temperature of the saturated carrier-gas less than 1° C., as long as saturated carrier-gas 55 is hotter at the inlet to dew-formation chamber 20 than the outlet from evaporation chamber 15. Virtually any external heat source can be used to provide the necessary additional heat because: (1) only a small amount of external heat is needed to establish temperature differences across heat transfer wall 10 at any given height of the column; and (2) the temperature of the external heat is versatile. The additional heat may be obtained from virtually any source, e.g., low temperature solar heat, waste heat, steam, heat from combustible fuels, and/or the like. The additional heat provides a temperature gradient on dew-formation side 12 of heat exchange wall 10 that is higher (e.g. starting at a higher temperature) than the temperature gradient on evaporation side 14 of heat exchange wall 10. Thus, at any given height or length of the column, the average temperature on dew-formation chamber 20 is greater than the average temperature on evaporation chamber 15. Additional heat 70 and the flow rate of the carrier-gas is chosen to optimize (i) evaporation of the separable liquid component in evaporation chamber 15, and (ii) condensation of the separable liquid component in dew-formation chamber 20. Thus, it is advantageous to have the dew point temperature within the temperature gradient of dew-formation chamber 20, and the temperature at a desired vapor pressure of the separable component within the temperature gradient of evaporation chamber 15.

After adding heat 70, heated saturated carrier-gas 60 is then introduced into the top of dew-formation chamber 20. As heated saturated carrier-gas 60 moves down dew-formation chamber 20, heat is thermally communicated or transferred across heat transfer wall 10 to evaporation chamber 15. As a result, the separable liquid component naturally condenses on dew-formation side 12 of heat transfer wall 10. The condensate containing the separable liquid component is then collected at the bottom or outlet of dew-formation chamber 20 and exits out as distillate 80. Pump 99 is optional and may be included for below 14.7 psia applications.

Remaining carrier-gas 65 also exits at the bottom of dew-formation chamber. Remaining carrier-gas 65 may exit away from the separated liquid component, i.e., it may not be bubbled through distillate 80. Remaining carrier-gas 65 may then be recycled in part or in whole to feed carrier-gas stream 50. Accordingly, carrier-gas 65 may enter condensing/heat exchanger 96, which removes any remaining heat 72 to heat sink 104. Cool carrier-gas 50 is returned to the bottom of evaporation chamber 15.

It may be desirable to remove as much volatiles from carrier-gas 50 as possible before it is returned to the bottom of evaporation chamber 15 so that non-separable volatiles are not reintroduced into evaporation chamber 15. One method may be to use an absorber with an absorption liquid to dissolve the volatiles in the gas. For example, liquid feed 30 may be used as the liquid for dissolving the volatiles.

Figure 2:
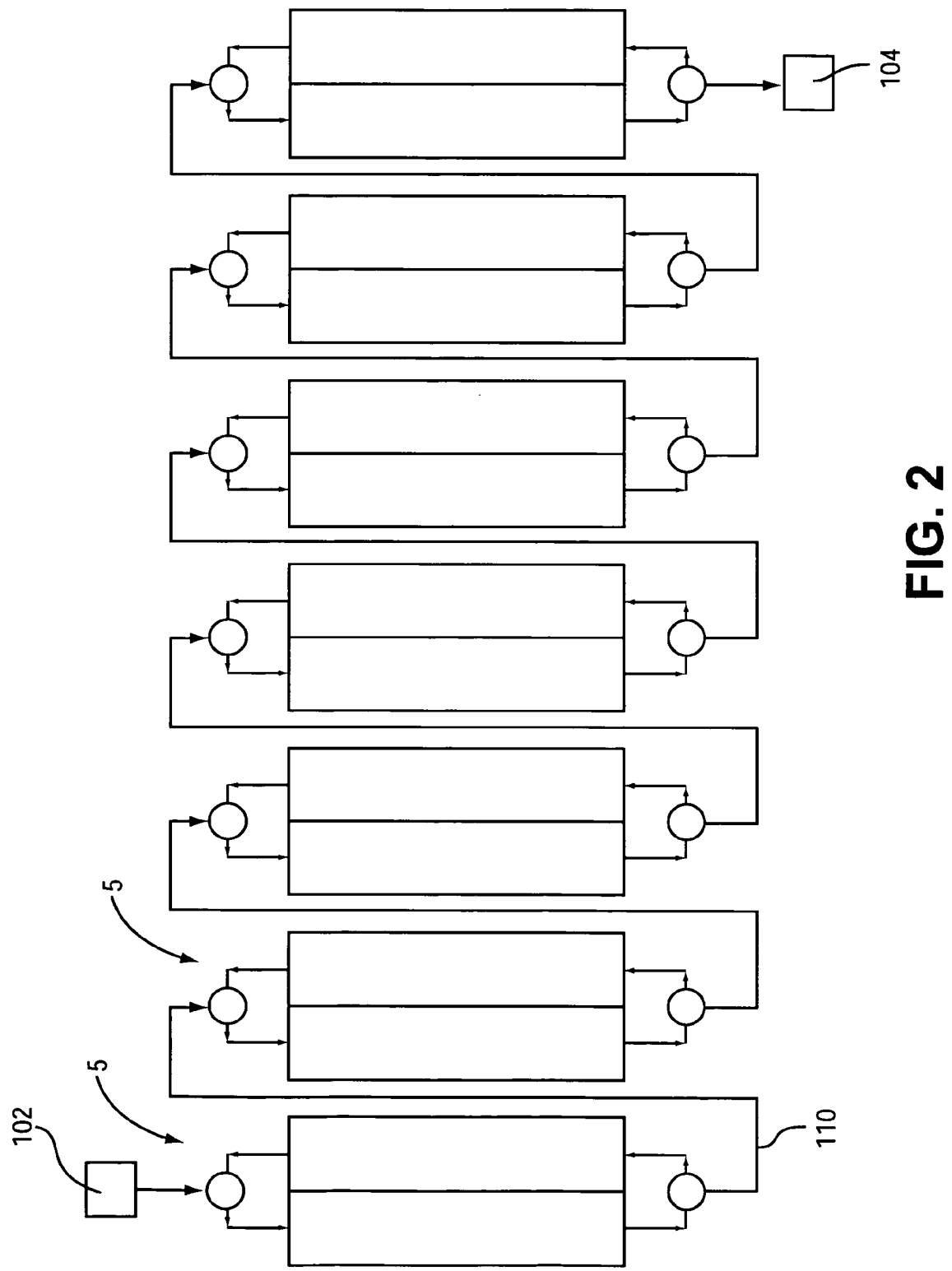
FIG. 2 is a schematic of a continuous contacting system implementation.

There are a variety of system implementations for separating a liquid component from a liquid mixture. Notwithstanding and for the exemplary purposes of this disclosure, FIGS. 2-3 disclose two system implementations. The systems in FIGS. 2-3 may include at least two continuous contacting apparatuses 5 thermally coupled together in series or in parallel, first continuous contacting apparatus 5 having a first absolute pressure and second continuous contacting apparatus 5 having a second absolute pressure that is different (e.g. lower) than the first absolute pressure. This pattern is continued for each additional continuous contacting apparatus 5 that may be used. Thus, the pressurized (and vacuum) continuous contacting apparatuses 5 are arranged in such a way so that high pressures go to low pressures. In this manner, high temperatures go to lower temperature continuous contacting apparatuses 5. Energy supplied to the top of the highest temperature (and highest pressure) continuous contacting apparatus 5 may be conducted from the bottom of the highest pressure continuous contacting apparatus 5 to the top of the next continuous contacting apparatus 5 in series. In this manner, the energy supplied to the highest temperature continuous contacting apparatus 5 may be reused in each tower to increase the overall energy efficiency by perhaps an order of magnitude.

Accordingly, a series of high pressure to low pressure continuous contacting apparatuses 5 thermally coupled in series may deliver ultra-effect evaporation. In particular examples, each continuous contacting apparatus 5 may have a multi-effect of 9. The total number of continuous contacting apparatus 5 and pressure ranges are the major variables. Also since the number of multi-effects is so high, there can be a reasonable trade-off between the multi-effects, f, and production density, Pf. At any constant water vapor to air ratio, V, the production density can be increased by reductions in multi-effect factor. This is accomplished by increasing the heat input to the top of the hottest continuous contacting apparatus 5 which increases the operating cost. The result is a larger temperature difference requiring less heat transfer area and therefore less capital cost.

Figure 3:
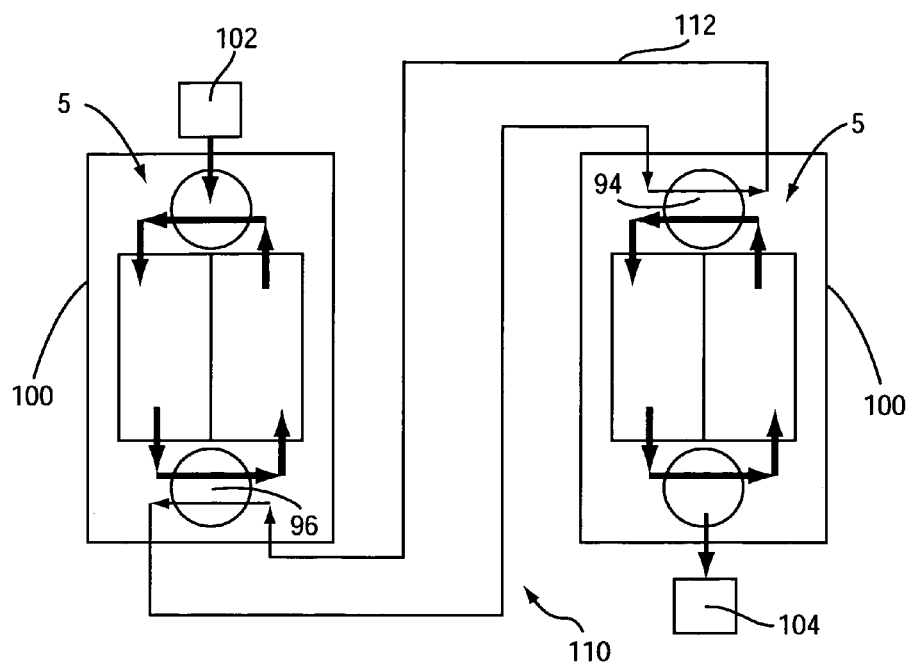
FIGS. 3-6 are schematics of thermal coupling implementations.

Although there are a variety of thermal coupling implementations so heat (not mass) flows from the bottom of one continuous contacting apparatus 5 (at a first absolute pressure) to the top of the next continuous contacting apparatus 5 (at a second absolute pressure less than the first absolute pressure), for the exemplary purposes of this disclosure and referring to FIG. 3, thermal coupling 110 may be provided. The continuous contacting apparatuses 5 may be thermally coupled together through fluid loop 112 in thermal communication with condensing heat exchanger 96 of the first continuous contacting apparatus 5 and evaporating heat exchanger 94 of the second continuous contacting apparatus 5. This thermal coupling opens up the concept that continuous contacting apparatuses 5 can be aligned vertically, horizontally, or at any angle in between.

3. Specifications, Materials, Manufacture, and Assembly

It will be understood that system and apparatus implementations are not limited to the specific components disclosed herein, as virtually any components consistent with the intended operation of a method, system and/or apparatus implementation may be utilized. Accordingly, for example, although particular walls, chambers, exchangers, pumps, compressors, valves, movers, sinks, sources, loops, and other components are disclosed, such components may comprise any shape, size, style, type, model, version, class, grade, measurement, concentration, material, weight, quantity, and/or the like consistent with the intended operation of a method, system and/or apparatus implementation. Implementations are not limited to uses of any specific components, provided that the components selected are consistent with the intended operation of a method, system and/or apparatus implementation.

Accordingly, the components defining any system or apparatus implementation may be formed of any of many different types of materials or combinations thereof that can readily be formed into shaped objects provided that the components selected are consistent with the intended operation of a method, system and/or apparatus implementation. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polypropylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, nickel alloy, any combination thereof, and/or other like materials; any other suitable material; and/or any combination thereof.

Furthermore, the components defining any system or apparatus implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, milling, stamping, drilling, cutting, welding, soldering, riveting, punching, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, piping, any combination thereof, and/or the like for example, depending on, among other considerations, the particular material forming the components. Other possible steps might include sand blasting, polishing, powder coating, zinc plating, anodizing, hard anodizing, and/or painting the components for example.

4. Use

Implementations are particularly useful as desalinators. However, implementations are not limited to uses relating to desalination and the like. Rather, any description relating to desalination and the like is for the exemplary purposes of this disclosure, and implementations may also be useful as separators, concentrators, purifiers, strippers, volatile organic compound (VOC) removers, crystallizers, fractionators, and the like.

5. Other Implementations

Many additional implementations are possible.

Figure 4:
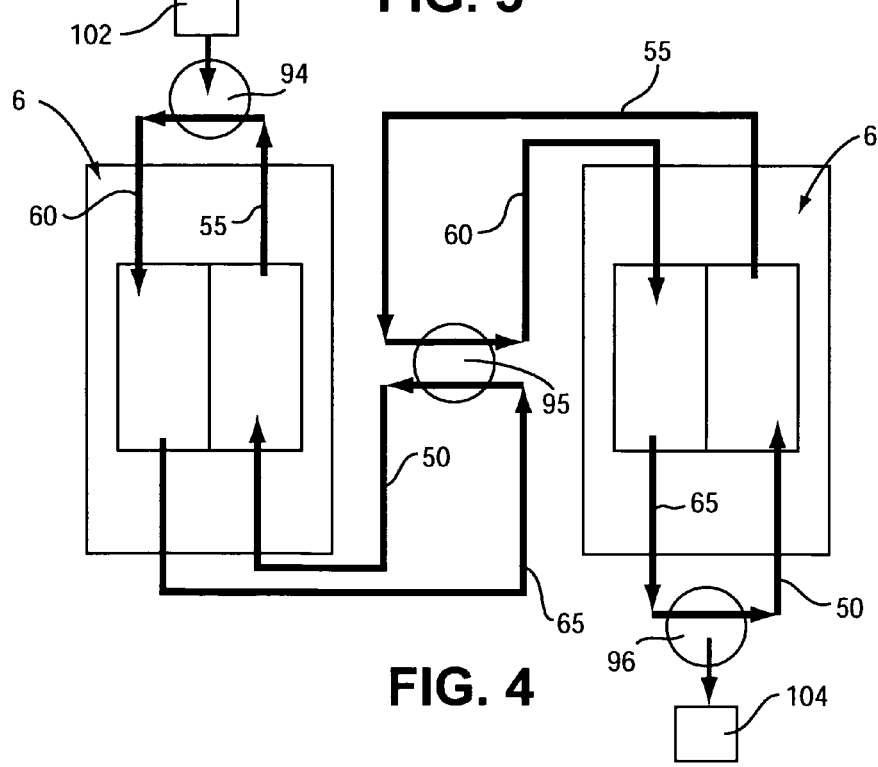
Figure 5:
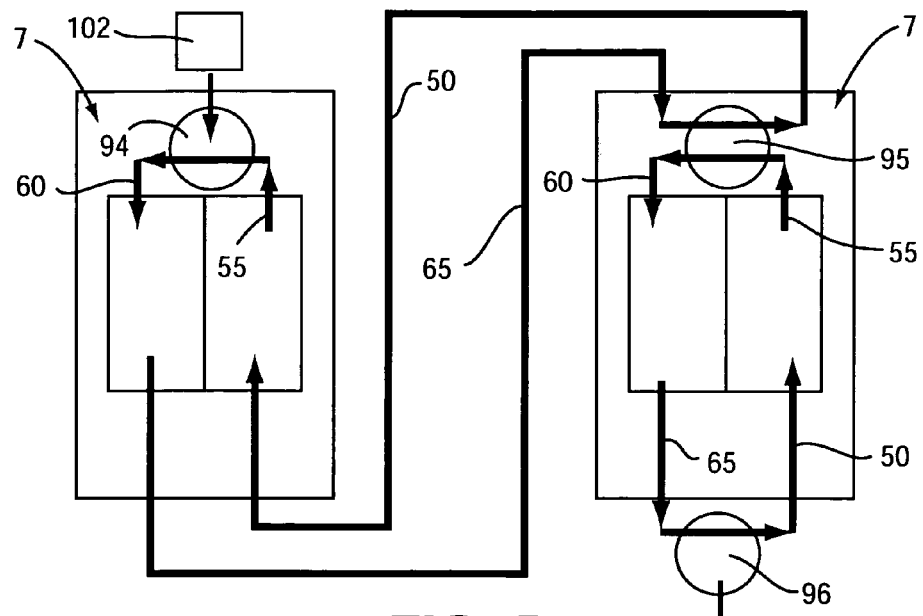
Figure 6:
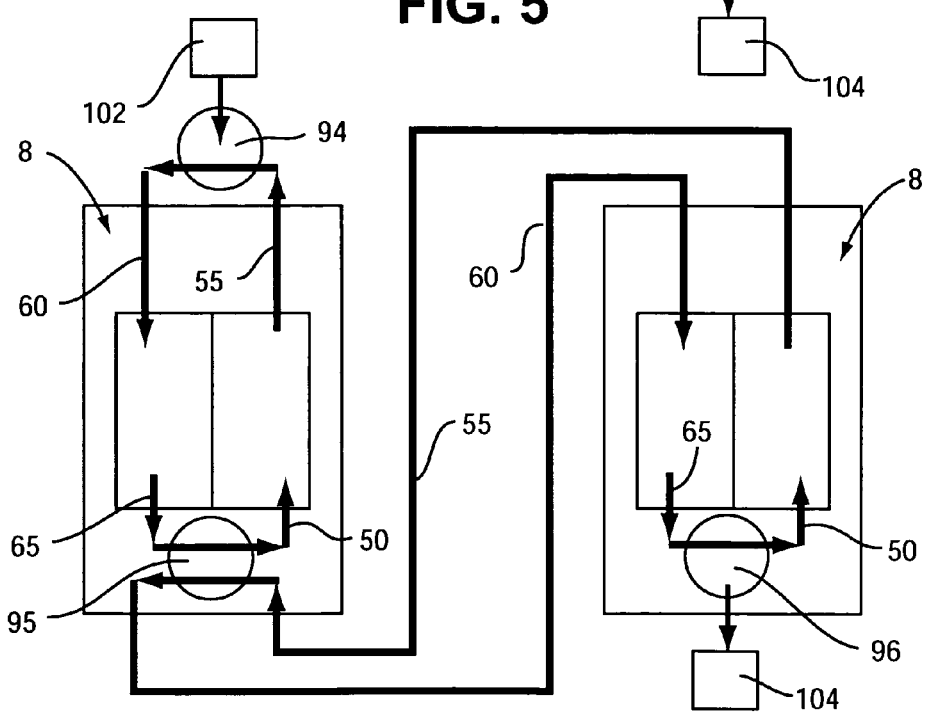

For the exemplary purposes of this disclosure, although there are a variety of thermal coupling implementations so heat (not mass) flows from one continuous contacting apparatus to the other, for the exemplary purposes of this disclosure and referring to FIGS. 4-6, at least three other thermal coupling implementations may be provided. These implementations have gas/vapor flows outside of their continuous contacting apparatuses.

Figure 12:
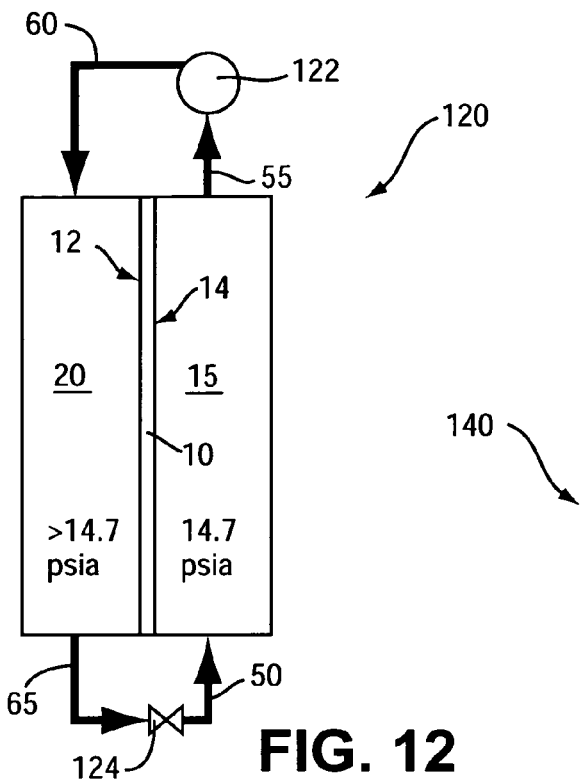
FIGS. 12-14 are continuous contacting vapor recompression apparatus implementations.
Figure 14:
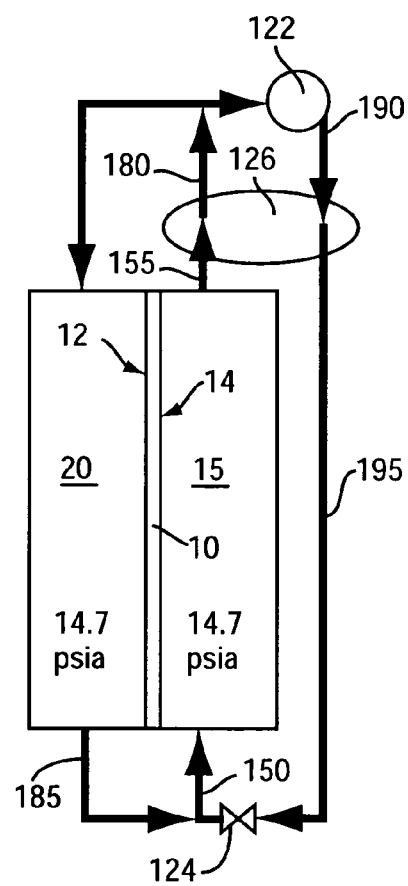
Figure 13:
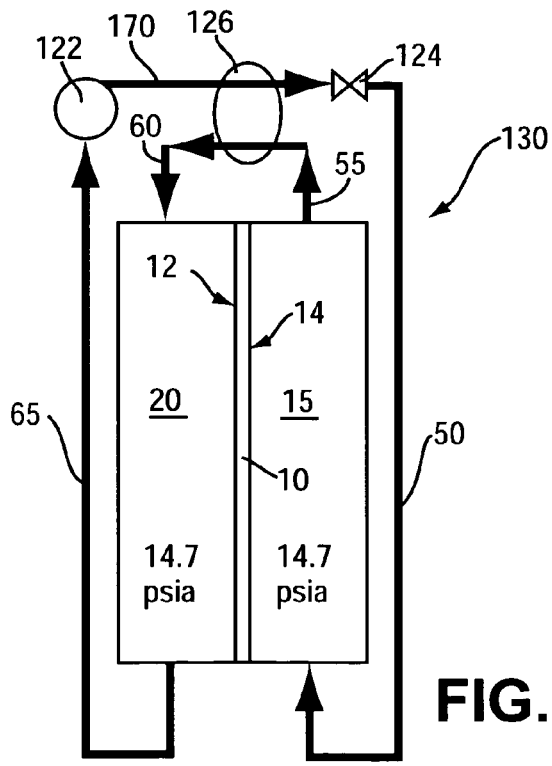

For the exemplary purposes of this disclosure, although there are a variety of continuous contacting apparatus implementations, for the exemplary purposes of this disclosure and referring to FIGS. 12-14, at least three continuous contacting vapor recompression apparatuses are depicted for separating a liquid component from a liquid mixture. In FIG. 12 in particular, continuous contacting vapor recompression apparatus 120 may be similar to continuous contacting apparatus 5. The principal differences are evaporation chamber 15 operating at a first absolute pressure and dew-formation chamber 20 operating at a second absolute pressure higher than the first absolute pressure. These absolute pressures may be at least within 1 psi of each other. Other differences include compressor 122 for compressing the carrier-gas from the outlet of evaporation chamber 15 and pressure release valve 124 for reducing pressure of the carrier-gas from the outlet of dew-formation chamber 20.

Further implementations are within the CLAIMS.

6. Examples

Figure 7:
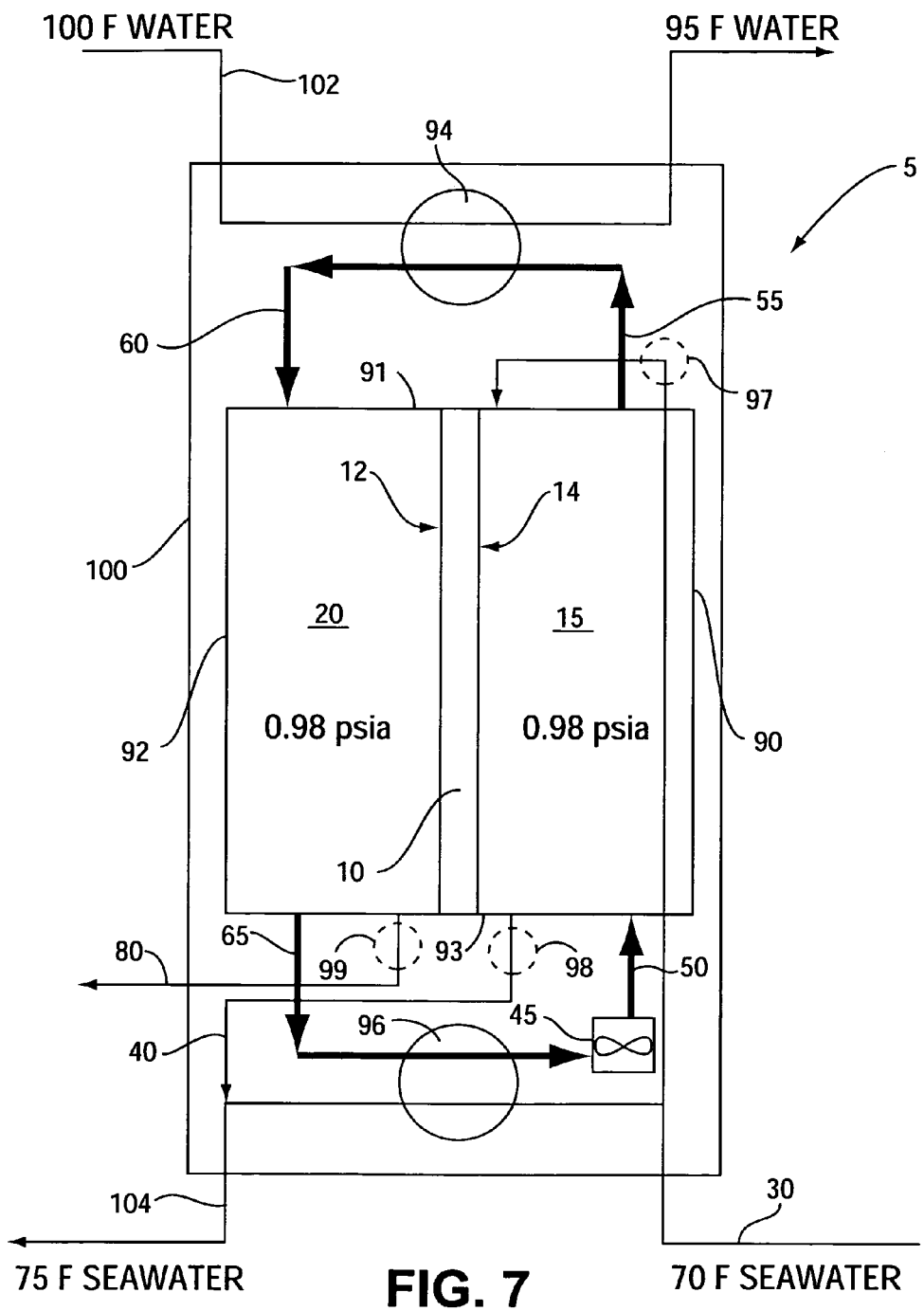
FIG. 7 is a schematic of the continuous contacting apparatus of FIG. 1 in a waste heat vacuum application for desalination.
Figure 8:
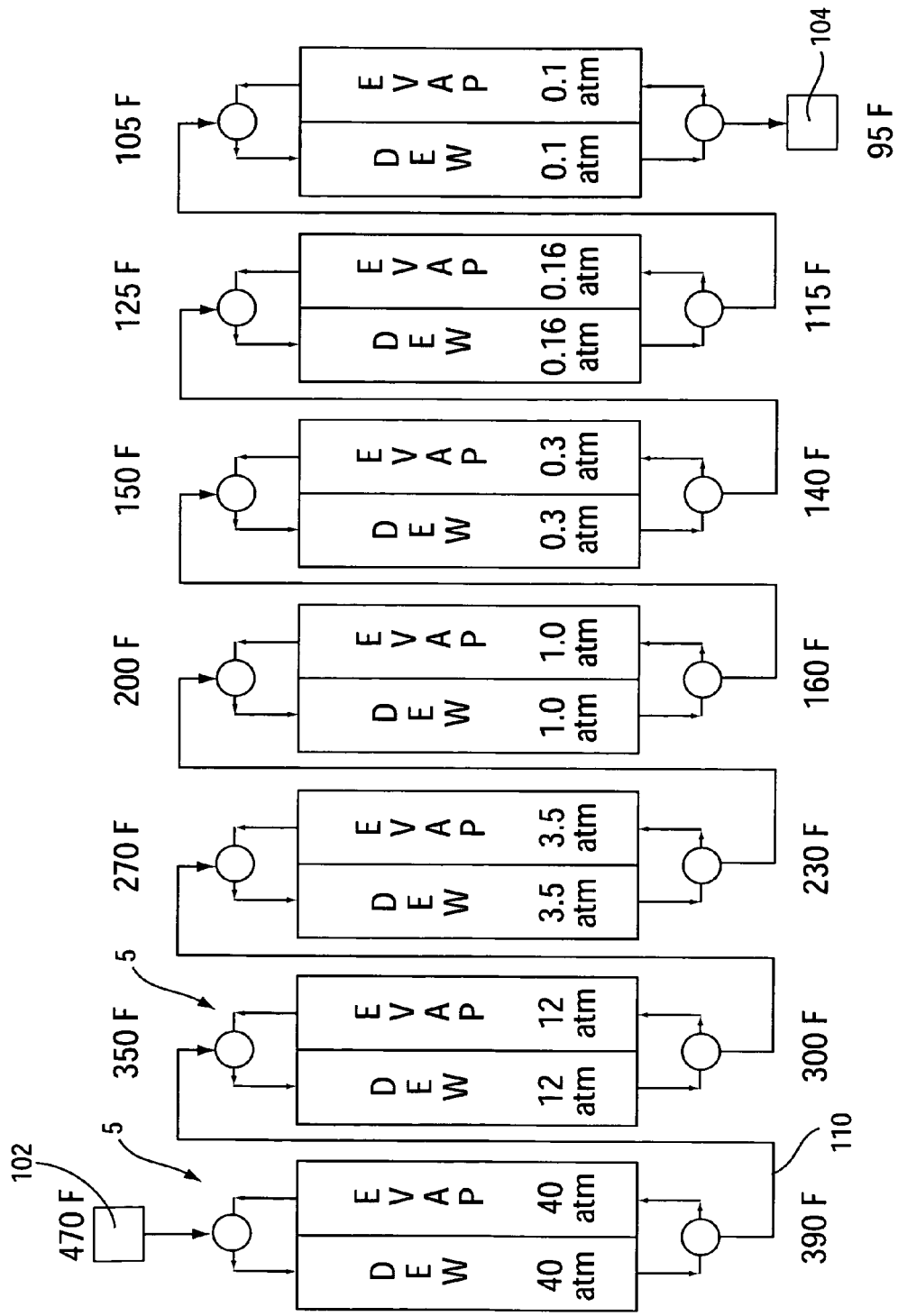
FIG. 8 is a schematic of the continuous contacting system of FIG. 2 in a particular application.
Figure 9:
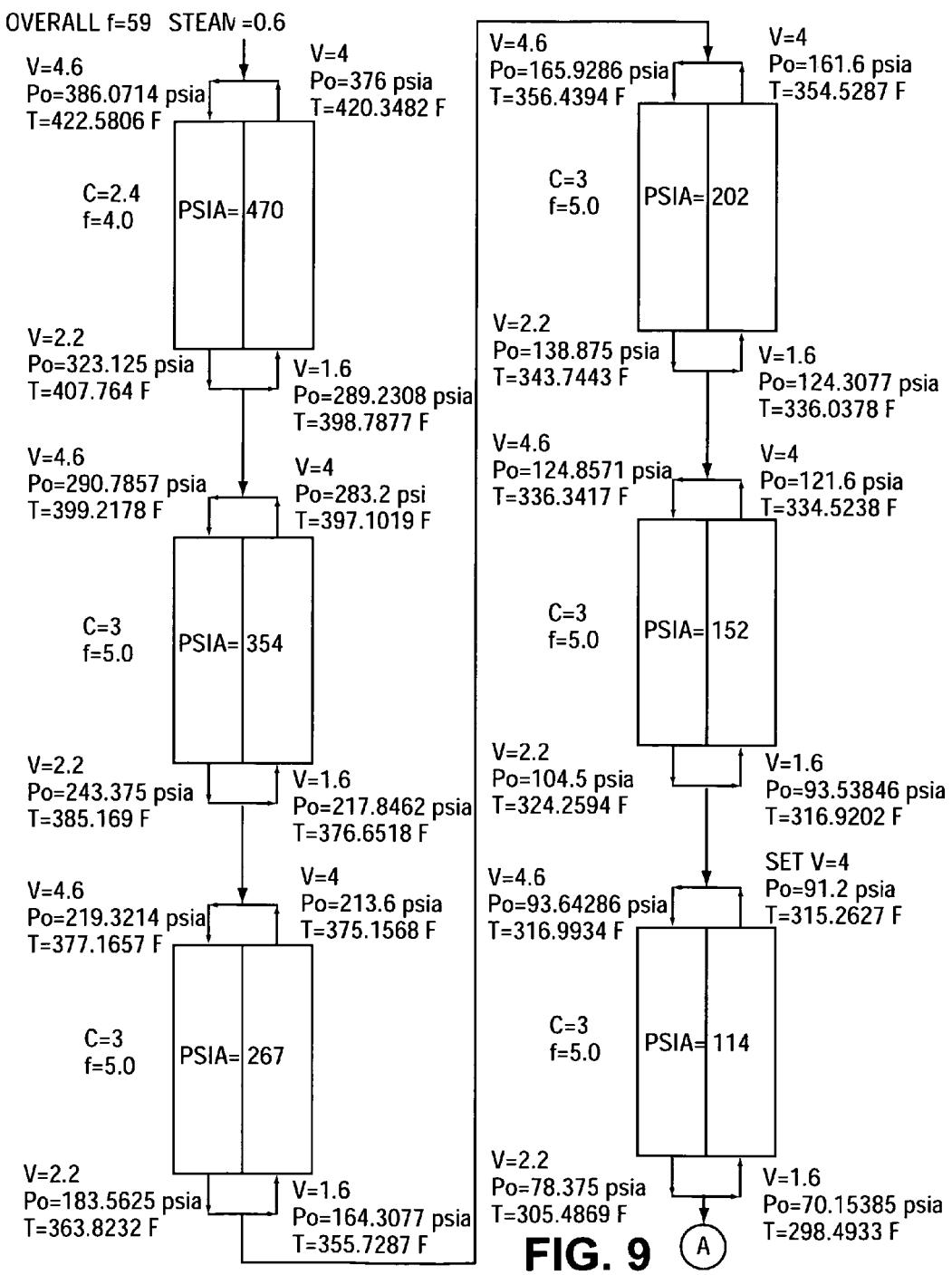
FIG. 9 is a schematic of a continuous contacting system implementation with continuous contacting apparatuses thermally coupled together in series at high pressure decreasing to atmospheric pressure.
Figure 9:
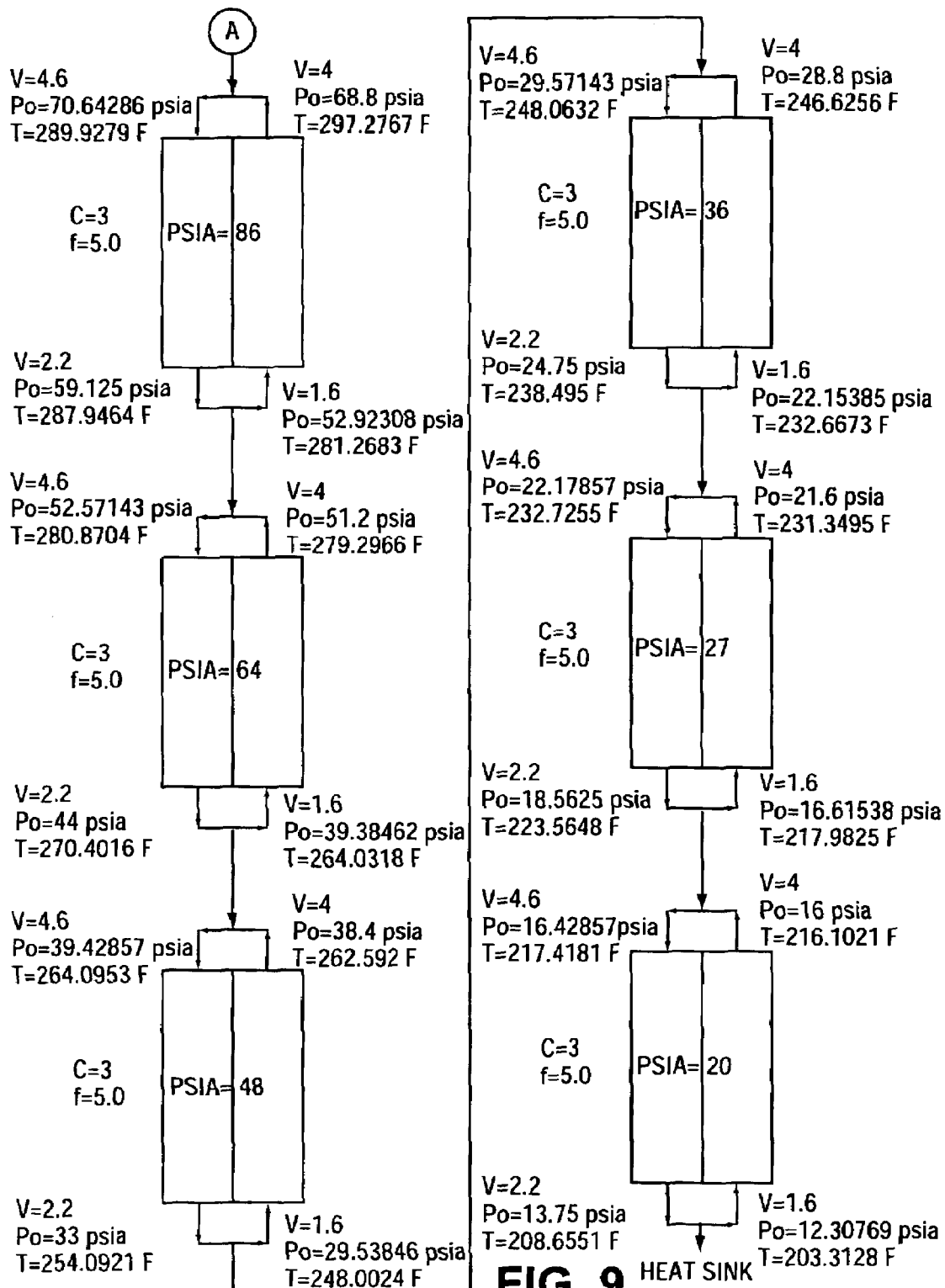
Figure 10:
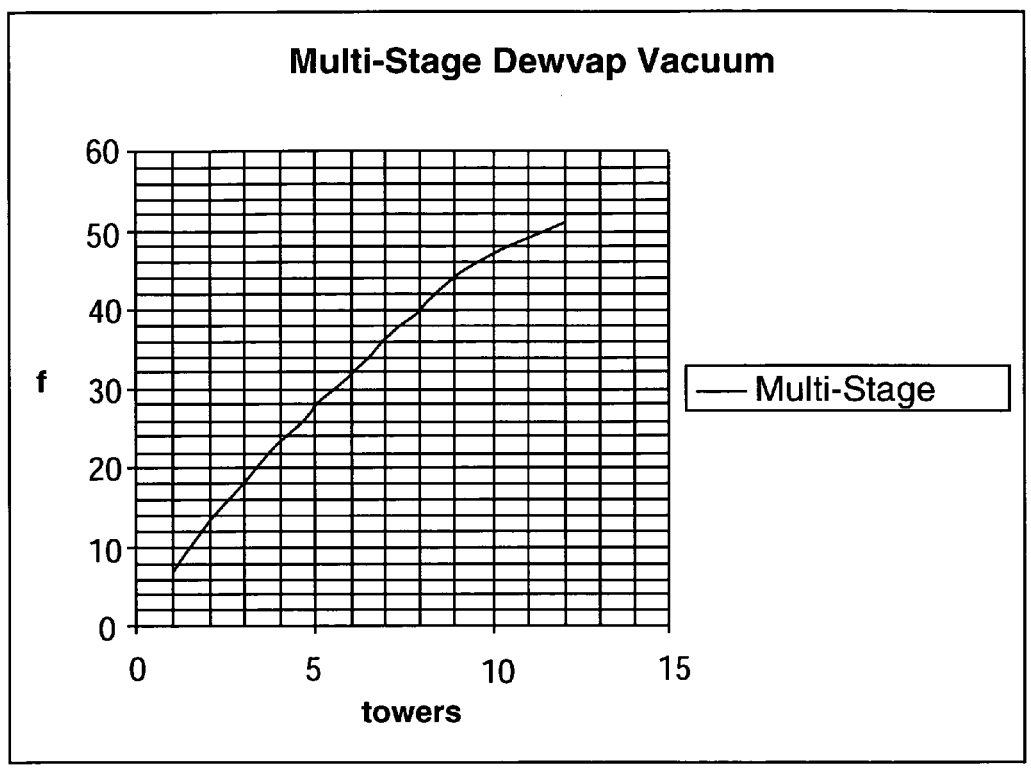
FIG. 10 is a graph of the energy reuse factor, "f", versus the number of continuous contacting apparatuses.
Figure 11:
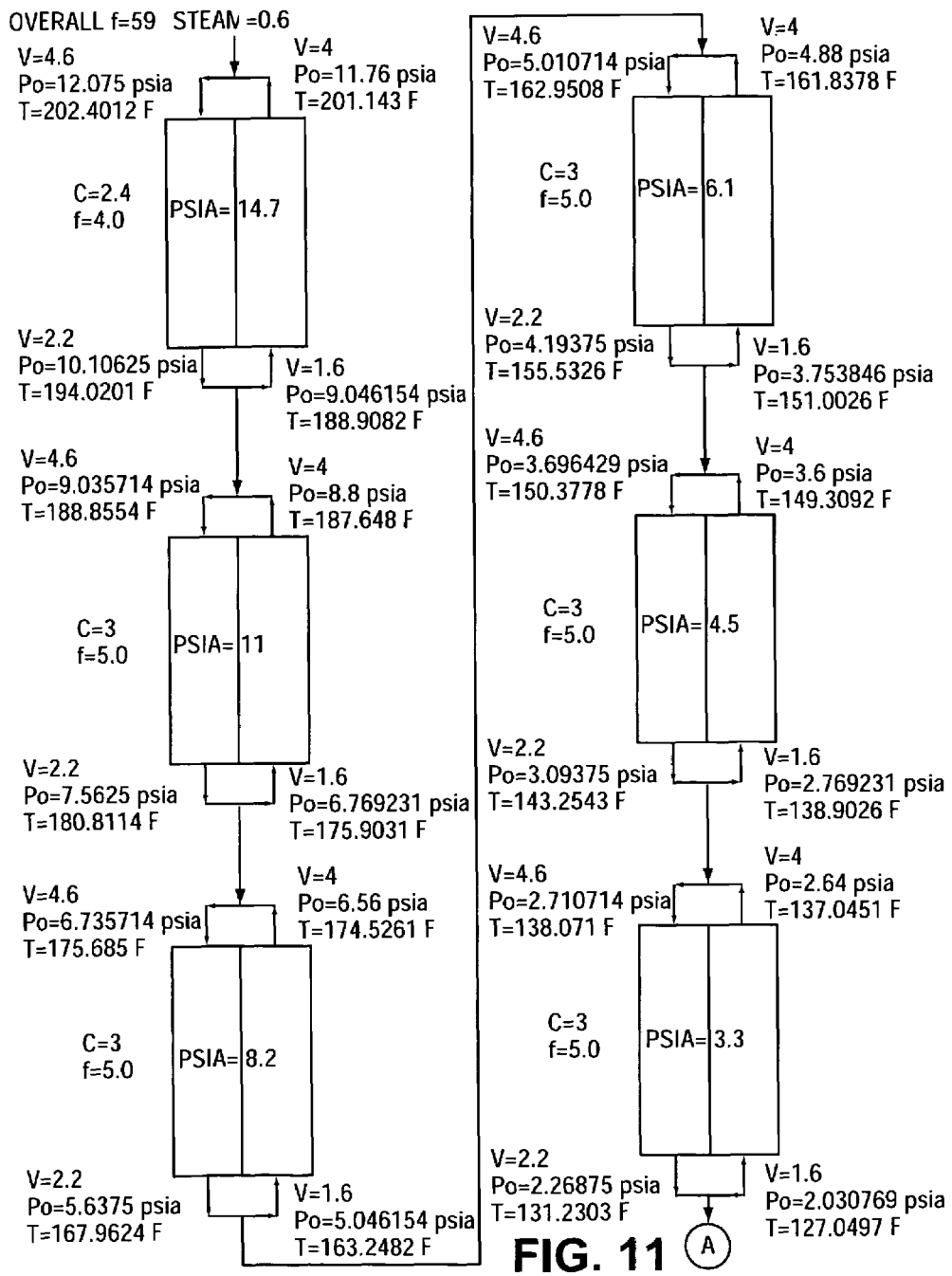
FIG. 11 is a schematic of a continuous contacting system implementation with continuous contacting apparatuses thermally coupled together in series at atmospheric pressure decreasing to vacuum.
Figure 11:
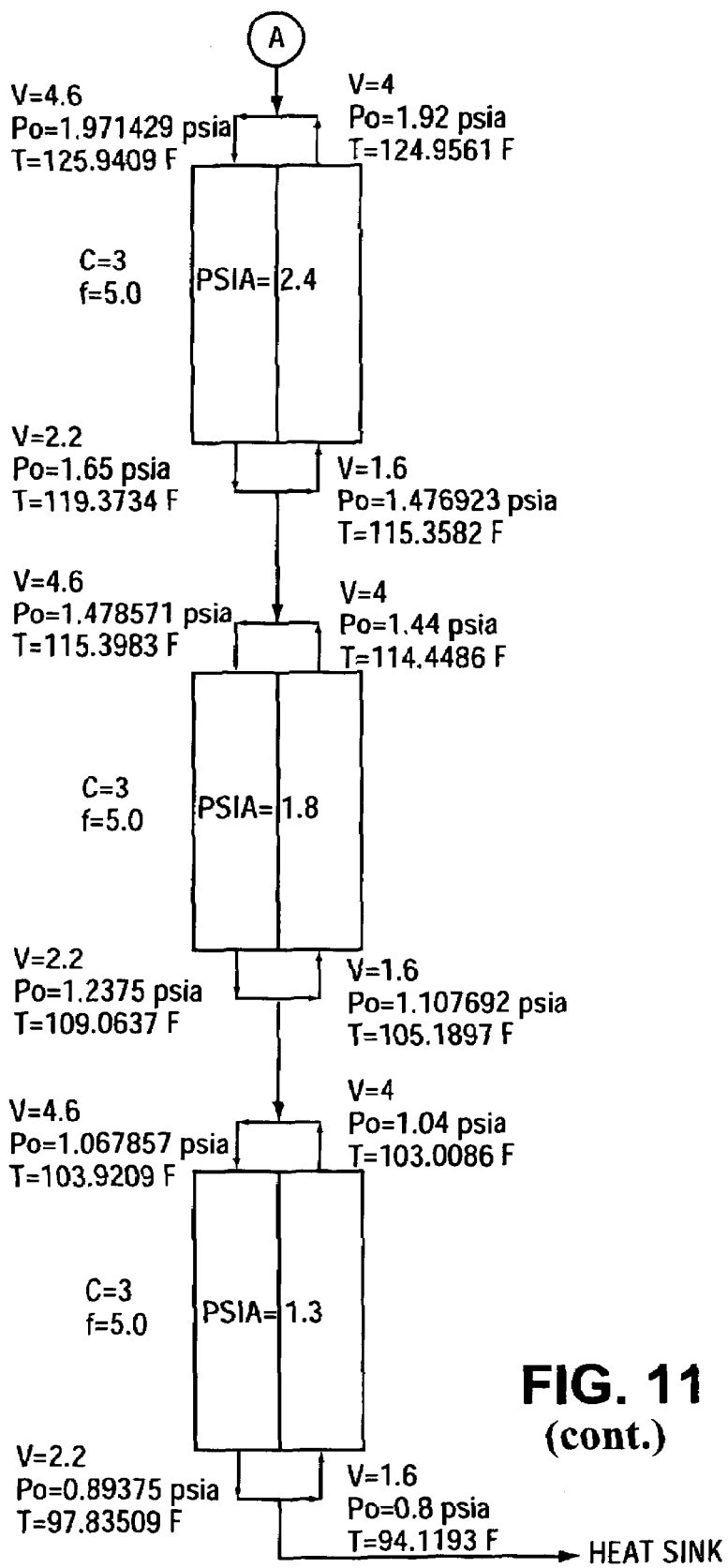

In describing the use of implementations further, the examples depicted in FIGS. 7-11 further illustrate, not limit, the invention. In particular, FIG. 7 depicts a waste heat vacuum application for desalination where low temperature, throw-away waste heat (from an electric power plant cooling water or inexpensive solar collector for example) is used to desalinate brackish or seawater for free.

The invention claimed is:

1. A method for separating a liquid component from a liquid mixture in a continuous contacting manner, the method comprising:
    thermally coupling at least two continuous contacting apparatuses together;
    varying the pressure between the at least two continuous contacting apparatuses by operating the first continuous contacting apparatus at a first absolute pressure and operating the second continuous contacting apparatus at a second absolute pressure that is different than the first absolute pressure, the first and second absolute pressures being within 1 psi; and
    allowing heat removed from the first continuous contacting apparatus to be the heat delivered to the second continuous contacting apparatus.

2. The method of claim 1, wherein thermally coupling comprises thermally coupling at least two continuous contacting apparatuses together in series.

3. The method of claim 2, wherein thermally coupling comprises thermally coupling at least two continuous contacting apparatuses together through a fluid loop in thermal communication with a condensing heat exchanger of the first continuous contacting apparatus and an evaporating heat exchanger of the second continuous contacting apparatus.

4. The method of claim 1, wherein the varying the pressure between the at least two continuous contacting apparatuses comprises operating the first and second continuous contacting apparatuses at absolute pressures in a range of about high pressure to about high vacuum.

5. The method of claim 1, wherein the varying the pressure between the at least two continuous contacting apparatuses comprises operating the first and second continuous contacting apparatuses at absolute pressures in a vacuum range.

6. The method of claim 1, wherein the varying the pressure between the at least two continuous contacting apparatuses comprises operating the first and second continuous contacting apparatuses at absolute pressures in a range of about high pressure to about atmospheric pressure.

7. The method of claim 1, wherein the varying the pressure between the at least two continuous contacting apparatuses comprises operating the first and second continuous contacting apparatuses at absolute pressures in a range of about 0 psia to about 2,000 psia.

8. The method of claim 7, wherein the varying the pressure between the at least two continuous contacting apparatuses comprises operating the first and second continuous contacting apparatuses at absolute pressures in a range of about 0 psia to about 470 psia.

9. A system for separating a liquid component from a liquid mixture, the system comprising:
- at least two continuous contacting apparatuses thermally coupled together, the first continuous contacting apparatus operating at a first absolute pressure and the second continuous contacting apparatus operating at a second absolute pressure that is within 1 psi of the first absolute pressure, wherein each continuous contacting apparatus is made of a plastic or polymeric material, wherein each continuous contacting apparatus comprises:
- an evaporation chamber having first and second ends, an inlet and an outlet for carrier-gas, and an inlet and an outlet for a liquid mixture, wherein the inlet for the liquid mixture and the outlet for the carrier-gas are located at the first end of the evaporation chamber, and the outlet for the liquid mixture and the inlet for the carrier-gas are located at the second end of the evaporation chamber;
- a dew-formation chamber having first and second ends, an inlet and an outlet for a carrier-gas, and an outlet for a separable liquid component, wherein the inlet for the carrier-gas is located at the first end of the dew-formation chamber, and the outlet for the carrier-gas and the outlet for the separable liquid component are located at the second end of the dew-formation chamber;
- a common heat transfer wall capable of providing thermal communication between the evaporation chamber and the dew-formation chamber;
- a heat source for heating the carrier-gas from the outlet of the evaporation chamber, wherein the heated carrier gas is directed to flow into the inlet of the dew-formation chamber;
- a heat sink for cooling the carrier-gas from the outlet of the dew-formation chamber, wherein the cooled carrier gas is directed to flow into the inlet of the evaporation chamber;
- an evaporating heat exchanger, wherein heat from the heat source is brought into thermal communication with the carrier-gas; and
- a condensing heat exchanger, wherein the carrier-gas is brought into thermal communication with the heat sink.

10. The system of claim 9, wherein the first and second absolute pressures are each an absolute pressure in a range of about high pressure to about high vacuum.

11. The system of claim 9, wherein the first and second absolute pressures are each an absolute pressure in a vacuum range.

12. The system of claim 9, wherein the first and second absolute pressures are each an absolute pressure in a range of about high pressure to about atmospheric pressure.

13. The system of claim 9, wherein the first and second absolute pressures are each an absolute pressure in a range of about 0 psia to about 2,000 psia.

14. The system of claim 9, wherein the first and second absolute pressures are each an absolute pressure in a range of about 0 psia to about 470 psia.

15. The system of claim 9, wherein the at least two continuous contacting apparatuses are thermally coupled together in one of series and parallel.

16. The system of claim 9, wherein the at least two continuous contacting apparatuses are thermally coupled together through a fluid loop in thermal communication with a condensing heat exchanger of the first continuous contacting apparatus and a evaporating heat exchanger of the second continuous contacting apparatus.

17. The system of claim 9, wherein the common heat transfer wall includes a plurality of common heat transfer walls.

18. The system of claim 17, wherein the plurality of common heat transfer walls includes at least 30 heat transfer walls.

* * * * *